F. A. APFELBAUM.
SPOT LIGHT SONG AND LECTURE LANTERN SLIDE.
APPLICATION FILED AUG. 19, 1911.
1,010,214.  Patented Nov. 28, 1911.
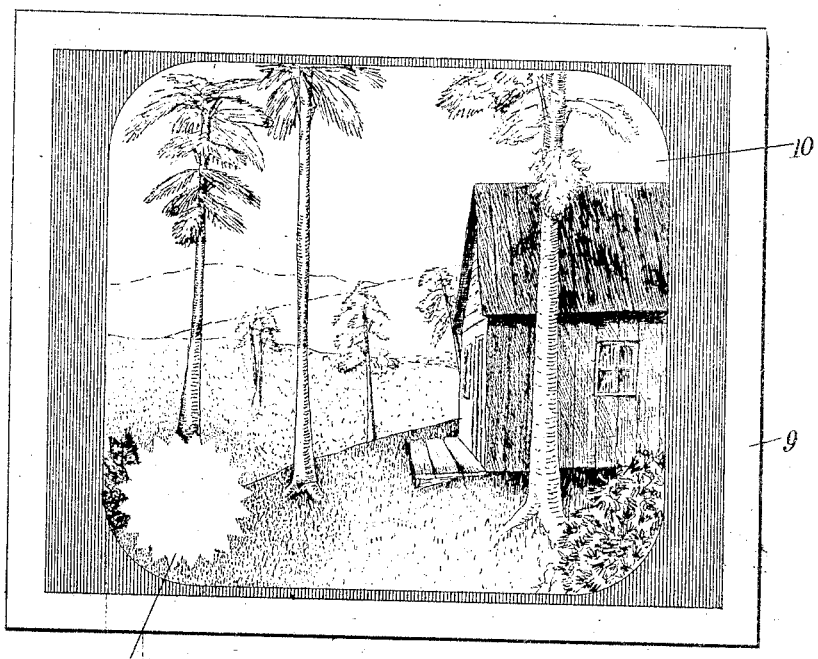
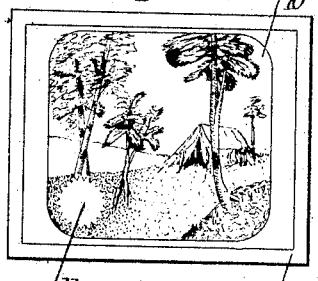
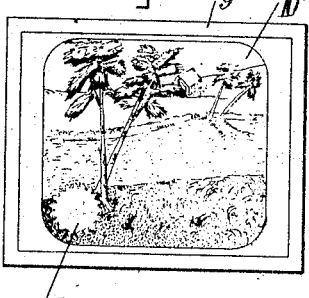
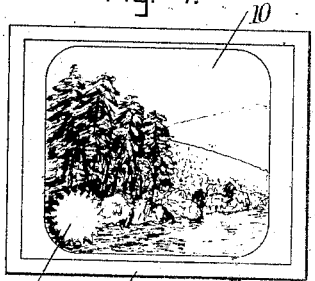
WITNESSES
INVENTOR
Frederick A. Apfelbaum
BY
ATTORNEYS

UNITED STATES PATENT OFFICE

FREDERICK A. APFELBAUM, OF NEW YORK, N. Y.

SPOT-LIGHT SONG AND LECTURE LANTERN-SLIDE.

1,010,214.　　　Specification of Letters Patent.　Patented Nov. 28, 1911.

Application filed August 19, 1911. Serial No. 644,914.

*To all whom it may concern:*

Be it known that I, FREDERICK A. APFELBAUM, a citizen of the United States, and a resident of the city of New York, borough of Manhattan, in the county and State of New York, have invented a new and Improved Spot-Light Song and Lecture Lantern-Slide, of which the following is a full, clear, and exact description.

Among the principal objects which the present invention has in view are: to provide a lantern slide for employment in connection with illustrated songs and lectures, having a clear space therein to form an illuminating area for the disclosure of the entertainer; and to provide in a lantern slide of the character set forth a clear area within the field of the photograph to form a spot light for the illumination of the entertainer.

One embodiment of the present invention is disclosed in the structure illustrated in the accompanying drawings, in which like characters of reference denote corresponding parts in all the views, and in which—

Figures 1, 2, 3 and 4 are views of lantern slides constructed and arranged in accordance with the present invention.

As shown in the accompanying drawings, the slides are provided with the usual frame 9, and the light area or field 10 on which the transparency or photograph is printed. In a preferred location, and one suitable for the purpose, is formed a clear space or light spot 11. In the usual formation of the slides the spot 11 is so disposed on the slide as to be formed or surrounded by a darkened portion of the slide, as will be seen by reference to the views in the present drawings.

The size and shape of the spot 11 is varied to suit the needs of the photograph or the desire of the entertainer. As shown in the drawings the spot is circular in form, having a saw-toothed or star-shaped perimeter or edge.

While I have herein shown the spot as being contained within the field 10, I wish it understood that the spot may be formed on the slide in the frame 9 and exterior to the field 10. Again, if it is wished, the spot may be contained partially within and without the perimeter of the said field.

The invention is considered by me broadly to consist in the formation in the slide itself of a light spot into which the entertainer moves when the picture is projected upon the screen usually employed, as counter-distinguished from the employment of a separate instrument or so-called light spot for illuminating or disclosing the entertainer.

When employing slides of the character described and shown the pictorial effects are produced as with the usual or ordinary slides. It will be found that in each case, when constructed in accordance with this invention, the light spot 11 forms a ray or path of light which produces on the screen a clear blank space, or what is known as a "spot light". During the entertainment the entertainer, singer or speaker, moves so that his or her head comes within the illuminated area and forms thereby an illumination seemingly comprising or composing a portion of the picture projected upon the screen.

Beyond the advantages due to the fact that the illumination of the person of the entertainer incorporates the picture thereof into the picture on the screen, a further advantage is gained in that there is not required a second mechanism or lantern, nor is the entertainment marred by the disadvantage of the necessary partial illumination of the space occasioned by the use of the second lantern to produce the spot light above referred to.

Having thus described my invention, what I claim as new and desire to secure by Letters Patent is:—

1. A lantern slide having a clear area to form a spot light.

2. A lantern slide having in the field thereof a clear area to form a spot light.

3. A lantern slide having completely within the field thereof a defined clear area to form a spot light.

4. A lantern slide having a clear area entirely comprised within the field of said slide to form a spot light, the edges of said area being shaped to form a frame for said spot light.

In testimony whereof I have signed my name to this specification in the presence of two subscribing witnesses.

FREDERICK A. APFELBAUM

Witnesses:
　E. F. MURDOCK,
　PHILIP D. ROLLHAUS.